United States Patent [19]

Odobasic

[11] Patent Number: 4,968,010

[45] Date of Patent: Nov. 6, 1990

[54] SLOTTED DISC AND ELASTOMERIC MATRIX DAMPER ASSEMBLY

[76] Inventor: Steven L. Odobasic, 1324 S. Shore Pl., Apt. 703, Erie, Pa. 16505

[21] Appl. No.: 319,300

[22] Filed: Mar. 6, 1989

[30] Foreign Application Priority Data

Mar. 9, 1988 [GB] United Kingdom ................ 8805612

[51] Int. Cl.$^5$ .............................................. B25B 1/08
[52] U.S. Cl. ................................... 267/162; 267/140.1; 267/141.1; 267/294
[58] Field of Search ...................... 267/140.1 A, 140.4, 267/294, 136, 292, 293, 141.1, 140, 158, 159, 162, 163, 164, 161; 248/636

[56] References Cited

U.S. PATENT DOCUMENTS

| | | | |
|---|---|---|---|
| 2,431,120 | 11/1947 | Howe | 267/161 |
| 2,515,188 | 7/1950 | Brennan | 267/294 |
| 3,013,792 | 12/1961 | Steinlein | 267/161 |
| 3,237,739 | 3/1966 | Pritchard | 267/161 |
| 3,259,383 | 7/1966 | Johnson et al. | 267/161 |
| 3,375,000 | 3/1968 | Seamanos et al. | 267/162 |
| 3,434,708 | 3/1969 | Hawk, Jr. | 267/294 X |
| 3,519,096 | 7/1970 | Lunzer | 267/162 X |
| 4,574,616 | 3/1986 | Miura et al. | 267/158 X |

FOREIGN PATENT DOCUMENTS

| | | |
|---|---|---|
| 679051 | 9/1952 | United Kingdom . |
| 862173 | 3/1961 | United Kingdom . |
| 1064334 | 3/1967 | United Kingdom . |
| 1098438 | 1/1968 | United Kingdom . |
| 1226650 | 3/1971 | United Kingdom . |

*Primary Examiner*—Robert P. Olszewski
*Assistant Examiner*—Matthew C. Graham
*Attorney, Agent, or Firm*—Howson and Howson

[57] ABSTRACT

A mechanical connection for providing desirable stiffness and damping of mechanical energy. The connection includes at least one frusto-conical annular disc element having a radial discontinuity extending from inner to outer peripheral edges, and a visco-elastomeric matrix on at least one annular face thereof. The cross sectional configuration of the element enables it to undergo axial displacement due to flexure of the disc as the matrix simultaneously undergoes shearing strains in generally tangential and radial directions.

14 Claims, 9 Drawing Sheets

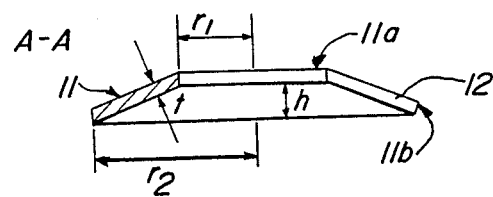
FIG.1A
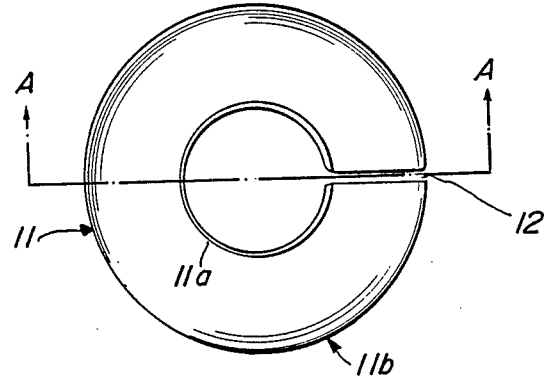
FIG.1B
FIG.1C
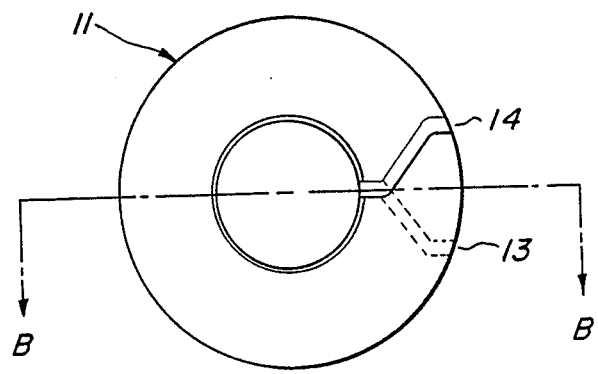
FIG.1D
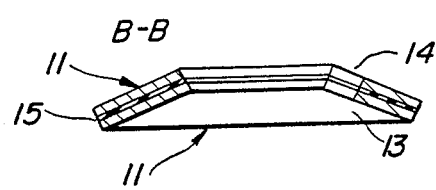
FIG.1E $\overline{20-21} = \Delta$ $\overline{20'-21'} = \Delta$ $\dfrac{\Delta}{t_e} = \varepsilon_s^{max}$

SLOTTED DISC AND ELASTOMERIC MATRIX DAMPER ASSEMBLY

BACKGROUND OF THE INVENTION

This invention relates to apparatus and systems for effecting an axially elastic, energy dissipating connection or to devices for controlling vibration, for example, between articles, elements and components; and in respect of damping of the harmonic oscillations of masses and structures relative to supports and anchorages therefor.

In numerous industrial applications and in relation to many components of apparatus the operation of a revolving part of the machine, equipment etc., produces rotating loads which can adversely affect the overall performance of the apparatus, article, machine and/or equipment.

The need for vibration control systems is particularly well known. Thus, for example, in relation to motor vehicles the need to provide effective, reliable and simple isolation i.e., the damping of the transmitted oscillations from the road running wheels to the passenger carrying compartment.

As is well known the passage of a vehicle over widely differing terrains and in a wide range of possible environmental conditions likely to be met during the use of the vehicle the arrangements provided for controlling, or at least reducing, dynamic loads induced into the vehicle by reason of its use, need to accommodate highly complex sudden and impact overload or shock absorbing systems.

Furthermore, since dynamic damping means are frequently conventionally interposed between the vibrating member and the member(s) from which vibration is to be prevented it is essential that any requirements in relation to factors such as ultimate dynamic/static strengths and safety of the entire system are fully met.

In more general terms it is a very fundamental consideration to increase safety, fatigue and overall performance levels in the construction, use and operation of articles, structures, etc, by reducing amplitudes of vibration, and dynamic loading inherent and/or externally induced on the structure (for convenience the term structure will be used in this specification as relating to any assembly of mechanical elements, in which the proposals of the invention can be used).

SUMMARY OF THE INVENTION

It is an object of the present invention to provide a mechanical element exhibiting axially elastic load carrying capability with two regions of axial stiffness.

Broadly according to an aspect of the invention there is provided an axially elastic mechanical fluidless connection or arrangement for effecting an axially elastic connection between two mass bodies, elements, structures or the like in such manner as to provide low normal/high overload stiffnesses and simultaneous dissipation of external mechanical energy of oscillations into heat through hysteresis in shearing mode of an interposed visco-elastic matrix.

BRIEF DESCRIPTION OF THE DRAWINGS

For a better understanding of the invention and to show how to carry the same into effect reference will now be made to the accompanying drawings in which:

FIG. 1A is a diametrical cross sectional view of a body of revolution in the form of dished/conical springable element or shell with a discontinuity in the form of a radial cut, the section being in the direction A—A of FIG. 1B;

FIG. 1B is a plan view of FIG. 1A,

FIG. 1C is a perspective view of the spring element of FIG. 1A and 1B;

FIG. 1D is a plan view of a multi-element array of the disc spring elements as shown in FIGS. 1A, 1B, and 1C, together with an interleaving differential strain viscoelastomeric layer;

FIG. 1E is a section along the line B—B of FIG. 1D;

DESCRIPTION OF THE PREFERRED EMBODIMENTS

Figure 2A:
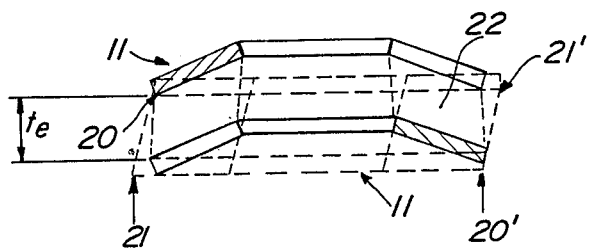
FIG. 2A is a cross sectional view on the line A—A of FIG. 2B, of an assembly of two spring elements and an interleaving primary elastomeric matrix, and in which the radial discontinuities are arranged diametrically opposite to each other.

Referring now to FIGS. 1A, 1B and 1C. A body of revolution in the form of a conical frustrum and constituted by a springable annular disc element is indicated at 11. The spring element has inner and outer peripheral edges 11a and 11b. A radially directed discontinuity in the form of a through cut or slot 12 extending from the inner edge to the outer edge is provided in the element 11. For the purposes of the following discussions the inner periphery 11a has a radius of r1, the outer periphery 11b has a radius of r2, the wall of the element a thickness of t, and an overall spring element height of h.

It should be noted that since, in practice, the spring element 11 would be punched or otherwise cut from a flat blank and subsequently deformed to the conical/dished formation illustrated in the Figures the inner and outer peripheral walls will be inclined to the vertical in the outwards sense (as is particularly seen in FIG. 1.)

As so far described the element 11 can be regarded as a statically determinate spring disc element. As a consequence of the provision of the radial slot or discontinuity, on axial deformation towards the planar form the maximum stress arising in the deformed plate 11 will be at the side thereof diametrically opposite to the discontinuity i.e., the radial slot or cut 12.

The radial cuts can take various forms and FIG. 1D shows the use of an expanded Z formation for the cut. In the Figure a generally clockwise directed cut or slot is shown in dashed lines at 13 and a generally anticlockwise directed cut or slot is shown in full lines at 14. Other forms for the cuts slots can be used, for example, they can be shaped to be in the form of tangents to spirals or to other curves, of Omega shape, or of any convenient curved or angular shape. The slots of the springable elements in the multi-disc arrays may be located on either side of a reference radial plane.

The FIG. 1E is a cross section of a multi element disc (sub-module) including two springable elements (shells) in a parallel array 11 and an interposed thin secondary elastomeric layer 15 comprising a pliable elastomer which serves as a 'differential strain' layer exclusively.

By departing from the simplest radial cut or slot form as indicated in FIGS. 1D and 1E the maximum stress within the spring elements 11 will in all cases occur opposite to the centroid of the slots 12. The maximum stress within the primary elastomeric matrix layer (not shown) also will not change with the departure from the simplest radial form. By utilising an assembly of at least two elements 11 in a multi-shell array with each adjacent pair of multi-shells separated by a primary elastomeric layer (not shown) and arranged in such manner that the radial discontinuity 12 of any one multi-shell array does not overlap the discontinuity 12 of either of the possible adjacent arrays modules can be produced which lead to a substantial reduction in stress levels due to the primary bending of the various spring elements 11 and by matrix induced secondary restoring stresses.

It should be noted that with the non-radial slot formations some reduction in local stress levels especially in the case of modules with a small number of spring elements is to be expected.

The materials utilised for the spring elements and the elastomers are to a great extent related to the intended application of the apparatus of the invention. Thus, for instance, when least weight of the damping apparatus is the main criterion then the spring elements 11 will be made from an aerospace composite such as glass and graphite reinforced plastics prepreg materials. Since the weight per unit of volume of elastomeric matrix is typically twenty percent below that of typical composites, the strain energy density, or the energy of hysteresis per unit of weight of this combination of the spring matrix materials will be very high.

If maximum fatigue life is the main criterion then the spring elements 11 will be made from special alloy spring steel. The first production operation in this case will be stamping of annular blank from stock material in its annealed state, forming the stamped-out blank into a slotted frusto-conical shape, followed by tempering processes to attain maximum strength.

In cases where the important criterion is minimum production costs, the materials used will be selected accordingly, and can involve plastics material, containing random fibres of glass or graphite (carbon), such as Torlon.

Figure 2B:
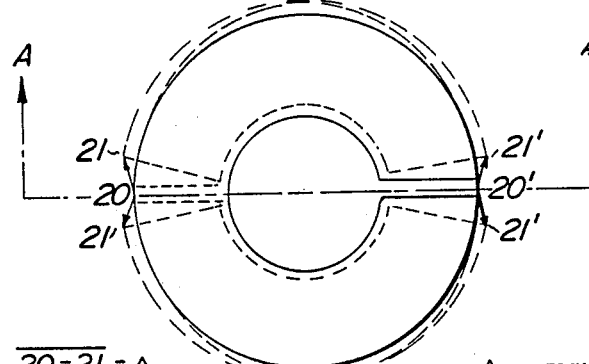
FIG. 2B is a elevation of the assembly of FIG. 2A.

Referring now to FIGS. 2A and 2B these illustrate a simple axially elastic spring damper module comprising two spring elements 11 arranged one above the other and separated by a primary elastomeric matrix layer 22 having a thickness '$t_e$' which is considerably greater than that of a differential strain secondary layer illustrated in FIG. 1E. Conveniently, the layer 22 is formed from a material exhibiting visco-elastic properties.

In the FIGS. 2A and 2B the full lines represent the module in its rest form that is before elastic axial deformation of the springable elements, whilst the dashed lines illustrate the conical elements as flat surfaces after having been axially deformed into the flat configuration i.e., as segments of a ring. If one considers the points 20 and 20' (i.e. points at the outer extremities of the slots) these points are located within the main plane of symmetry of the plate passing through the slots, and simultaneously at the foundation plane of subsequent spring elements. At these points axial, radial or tangential displacements do not occur. Zero points of two coordinate systems will, therefore, be located at the points 20 and 20'. At any other position of the spring elements 11 any displacements, i.e., axial, radial or tangential will take place on deformation of the spring elements. The Figures illustrate at the points 21 and 21' the maximum extent of radial and tangential displacements arising from axial deformation of the spring elements.

As may be noted the point 21 is located in a plane vertically above the plane containing the point 20, there will be a transverse recession of the point 21 in its plane relative to the position of the point 20 which is, with a reasonable degree of approximation, equal to the square root of the sum of the radial displacement squared plus the square of the tangential displacement. As mentioned the thickness of the matrix layer is '$t_e$' and $\epsilon_s$ represents the maximum shear strain. Similar considerations apply to the points 20' and 21' in relation to the other slot.

The provision of the primary elastomeric matrix layer 22 induces a shearing strain of the matrix which is equal to the relative transverse recession 20–21 divided by the thickness '$t_e$' of the elastomeric matrix layer 22.

It is well established that the hysteresis of specially formulated elastomers is greatest in shearing strain and stress mode ° The hysteresis in other modes of strain (compression, contact stress etc.,) in typical elastomers is always insufficient and can be neglected.

In applications where the slots 12 of subsequent springable elements 11 are offset with respect to each other (i.e., angularly phased with respect to each other) by 180 degrees the mean integral value of the relative shear strain for varying radii and angles of the spring elements 11 will be the greatest. However, when the slots are located one above the other, the relative strain within the elastomeric matrix will be zero.

There are, between the above mentioned two extremes, an infinite number of possibilities in respect of combinations of the phase angle '$\beta°$' of the slot location for multi-springable element modules or assemblies. This effect will be taken into account by multiplying the axial stiffness expression for the system phase angle '$\beta°$' of the slot location over 180°.

In addition, there are available several thousand presently formulated elastomers whose shear modulii vary within a very wide range. For example, from 50 pounds per square inch (0.34 Newtons per square millimeter) to 7000 pounds per square inch (48 Newtons per square millimeter). As a consequence of this the number of possibilities for the axial stiffness of a damping system incorporating the concepts of the invention with a single size of spring element is likewise very great.

Furthermore, all high hysteresis silicone rubber compounds are capable of withstanding very severe environmental conditions including temperature ranges from minus seventy degrees Celsius to plus three hundred degrees Celsius. For example, 'Acetoxy' and other silicone compounds.

The above mentioned axial stiffness involves two major components. The first component arises from elastic deformation of the slotted spring elements and the second arises from shear strains within the interstitial elastomeric matrix layer. The total axial stiffness may be dominated by the mechanical properties of the matrix (i.e., shear modulus) or alternatively by the thickness, diameter, coning angle, and modulus of elasticity of the spring element and also by the above mentioned phase location of slots angle '$\beta°$' ($0 \leq \beta° \leq 180$).

Figure 3A:
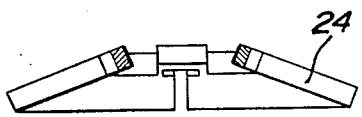
FIG. 3A is a cross sectional view on the line A—A of FIG. 3B, of an embodiment of a primary elastomeric layer for use with a module of the invention.
Figure 3B:
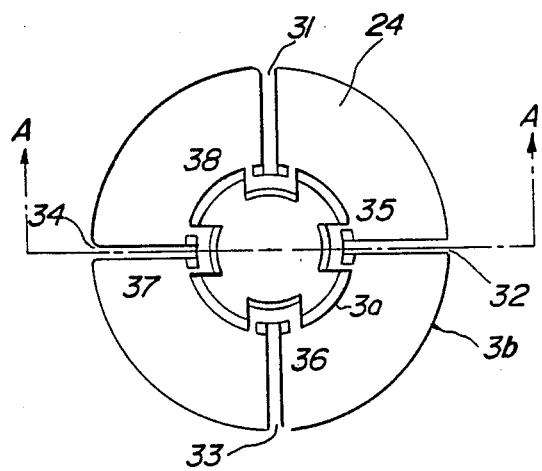
FIG. 3B is a elevation of the elastomeric layer of FIG. 3A; the layer incorporating four radial discontinuities each of Omega form.

Referring now to FIGS. 3A and 3B the primary elastomeric layer 15 shown therein has an annular dished or conical form. Four discontinuities i.e., slots or cuts 31,32,33, and 34 are formed in the layer thereby effectively separating the main body of the layer into four quadrants. The discontinuities have an angular Omega shape with the wider part of the Omega in each case located at an inwardly directed link 35,36,37, and 38 which provide an overall castellated shape to the inner periphery of the layer, for the purposes of location within assembly and vulcanisation fixtures. These parts can be regarded as ties which connect the four quadrants of the main body of the layer together. The provision of the four slots in the layer enables various combinations for the arrangements of the slots involved for module including four spring elements or shells.

The layers of FIGS. 3A and 3B can be moulded from a high hysteresis elastomeric compound. Such compounds have very elongated molecules. The bonding between the primary matrix layers and the spring elements is based upon standard vulcanisation or structural adhesive film techniques.

Figure 4A:
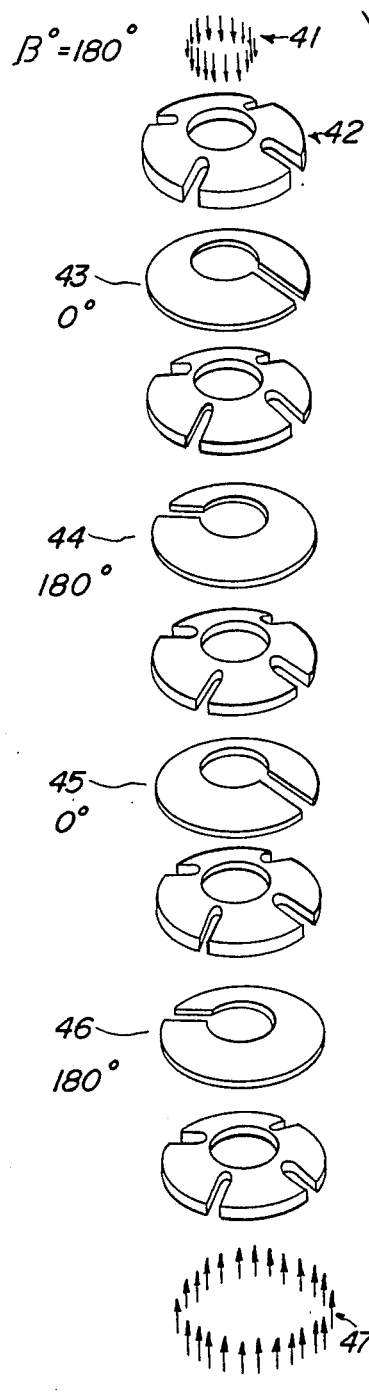
FIG. 4A is an exploded view of an assembly or module incorporating four spring elements and five associated elastomeric matrix layers, the Figure illustrating a first relative positioning or phasing of the discontinuities of the spring elements.
Figure 4B:
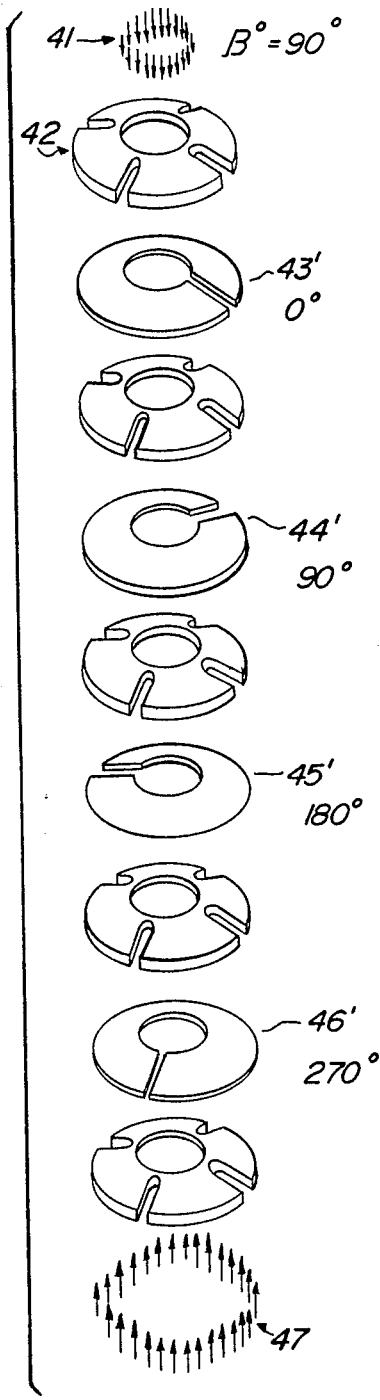
FIG. 4B is an exploded view of an assembly or module incorporating four spring elements and five associated elastomeric matrix layers, the Figure illustrating a second relative positioning or phasing of the discontinuities of the elements.

FIGS. 4A and 4B 4 illustrate in exploded form two different angular relationships for the slots of modules incorporating four spring element modules and the five associated elastomer matrix layers. Thus, for example, the relative angular relationships of the slots of the successive spring elements of a four element module can be for example as follows 0°, 180°, 0°, 180°, and 0°, 90°, 180°, 270°.

In the FIG. 4A the spring elements are numbered 43,44,45, and 46. The matrix or elastomer layers are numbered 42. FIG. 4A relates to a slot phase angle of 180 degrees The phase angles involved are indicated in the Figure. Also, arrangements for operationally coupling the module between two bodies, structures etc, (not shown) are indicated at 41 and 47.

The FIG. 4B is indicative of the case where the slot phase angle is 90°. In this Figure the spring elements are 43', 44',45'and 46' and the elastomer layers 42. The respective slot phase angles are as indicated on the FIG. 4B.

At this point it is convenient to consider very briefly some of the theoretical considerations upon which the the operational characteristics of the modules are based.

Thus the concepts of the present invention are based upon a hitherto unexploited concept of discontinuous shells in the form of springable bodies of revolution with discontinuities directed substantially radially relative to the axes of revolution of the shells or bodies and located within or bounded on at least one side with an elastomeric matrix.

To deal with this concept mechanical/mathematical models were established For the purposes of the present application the main features of such models will be discussed in relation to a frusto-conical springable element or shell and associated interstitial elastomer matrix layers. In considering the theory reference will be made to FIGS. 5A and 5B. The various reference lines and reference points will be introduced and defined during the discussion of the theory.

Figure 5A:
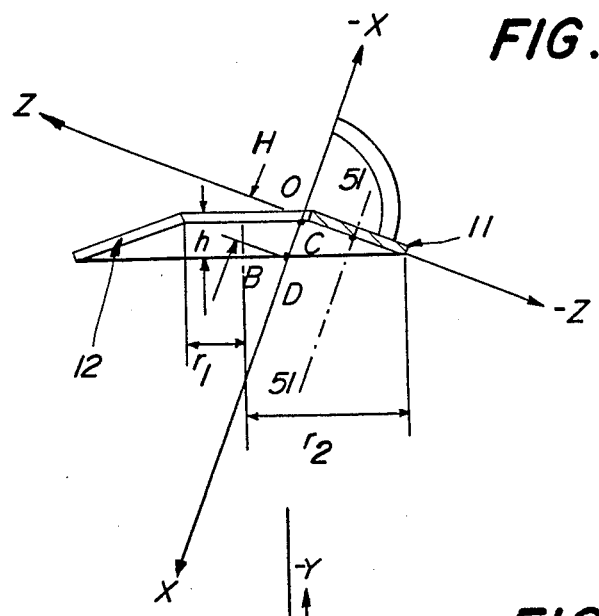
FIG. 5A is a diametrical cross sectional view of a body of revolution in the form of frusto-conical springable disc spring element or shell with a discontinuity in the form of a radial cut, the section being in along the line Z—Z of FIG. 5B; the FIG. 5A illustrating reference lines and points involved in a mathematical theory underlying the concepts of the invention.
Figure 5B:
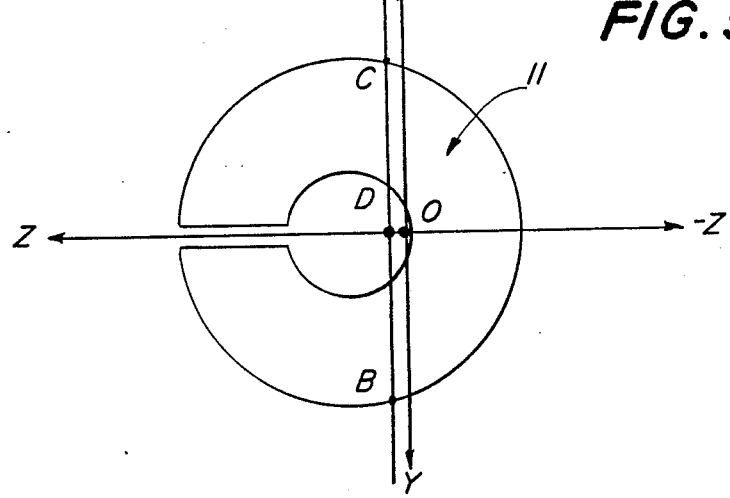
FIG. 5B is a plan view of FIG. 5A, the Figure also illustrating reference lines and points involved in said theory.

In the first place it was realised that the forshortening of the inner 'fibres' '$r_1$' and the extension or stetching of the outer 'fibres' '$r_2$' of the material during compression the slotless shells or conventional Belleville disc springs would be indicative of the existance of a stress system which could be considered as being substantially analogous to bending about the axis 51—51 which is perpendicular to the generator line (z)-(-z) of the frusto-conical shell shown in FIG. 5A and 5B. It was also realised that in the case of a frusto-conical shell with a slot or discontinuity the principal stresses will be zero in the proximity of the slot.

Furthermore, it was established that the amount of strain energy required during an elastic axial deformation of a slotted frusto-conical shell from its initial frusto-conical form, i.e., surface-in-space configuration, into a flat (planar) annulus will be of the same magnitude as the strain energy required in the reverse processes during the flexure of the plane annulus into the discontinuous frusto-conical form shell by, for example, using a three roller machine.

It thus follows that during the elastic deformation of the slotted frusto-conical conical shell the bending takes place about about the cone generator line (z)-(-z) as a neutral axis. It is known from the engineering theory of bending that the stress of flexed plates is proportional to the modulus of elasticity 'E' (lbs per square inch or Newtons per square millimeter), and to the thickness of the element 't' (in inches or millimeters) and inversely proportional to twice the radius of curvature 2R (inches or millimeters)

In the case of the slotted shell of FIG. 5 the point 'O', at which the radius of curvature R has it minimum and correspondingly where the stress is at its maximum, is at the intersection of the folllowing surfaces in space: the frusto-conical shell of the spring element and a plane which is perpendicular to the generator line z-(-z) of the shell at the point of its maximum height 'o'.

In addition to the above conditions in relation to the arrangement of FIG. 5 the minimum radius of curvature was placed through three points 'O' 'B' and 'C' which are located simultaneously on the shell and within the normal plane intersecting the x—x and y—y axes as shown in FIG. 5. Following computation of the distances BD and DO it can be shown that the minimum radius of curvature can be expressed by the following equation- $$R_{min} = \left[ \frac{r_2\sqrt{2 + T^2 + \frac{1}{T^2}} - \frac{h}{2}\left(2 + T^2 + \frac{1}{T^2}\right)}{\sqrt{1 + T^2}} \right]$$

(mm) (in)

where: $T = \frac{h}{r_2 - r_1}$

The maximum stresses occur at the point 'O', the compressive half of the spring element wall thickness above the neutral axis, and the tensile half of the spring element wall thickness located below the neutral axis.

However, the elastomerix matrix will be subjected to its maximum shearing strains and stresses within the region of the slot. The maximum shearing strain of the matrix whose thickness is '$t_e$' can be shown to be given by the following relationship:

$$\epsilon_s = \frac{r_2}{t_e} \sqrt{(\pi^2 + 4) \cdot [2 + T^2 - 2 \cdot \sqrt{1 + T^2}]}$$

(Dimensionless)

The axial stiffness of the main spring elements can be established by using the principles of equivalence between strain energy due to internal stress and external mechanical energy and can be represented by the following relationship:

$$\left(\frac{F}{y}\right)_{spring} = 0.218\, Et^3 \left(\frac{r_3 - r_4}{h\, R_{min}}\right)^2 \left(\frac{r_1 + r_2}{r_3 + r_4}\right)$$

$$\left(\frac{N}{mm}\right); \left(\frac{lb}{in}\right)$$

where:

$r_3 = r_2 \sqrt{1 + T^2}$ (mm); (in)

$r_3 - r_4 = h\sqrt{1 + \frac{1}{T^2}}$ (mm); (in)

and:

$R_{min} \geq \frac{Et}{2\, \sigma_{allowable}}$ (mm); (in)

The second component of the axial stiffness which is caused by the shear strains of the elastomeric matrix is given by the following relationship:

$$\left(\frac{F}{y}\right)_{matrix} = \left(\frac{\beta^\circ}{180^\circ}\right) \cdot 0.117 \cdot \left(\frac{\epsilon_s^{max}}{h}\right)^2 \cdot G_e \cdot V_e$$

$$\left(\frac{N}{mm}\right); \left(\frac{lb}{in}\right)$$

Whereas '$\beta^\circ$' is the phase angle of the slot location. For example, as shown in FIG. 4 the left hand side slot location has the phase angle '$\beta^\circ$'=180. Therefore, '$\beta^\circ$'/180=1. However, for the right hand slot the phase angle is '$\beta^\circ$'=90. Therefore, '$\beta^\circ$'/180=½. In the relationship '$G_e$' is the shear modules of the elastomeric matrix in lbs per square inch or Newtons per square millimeter. '$V_e$' is the volume of the elastomer within the module or individual layer in cubic inches or millimeters.

Figure 6:
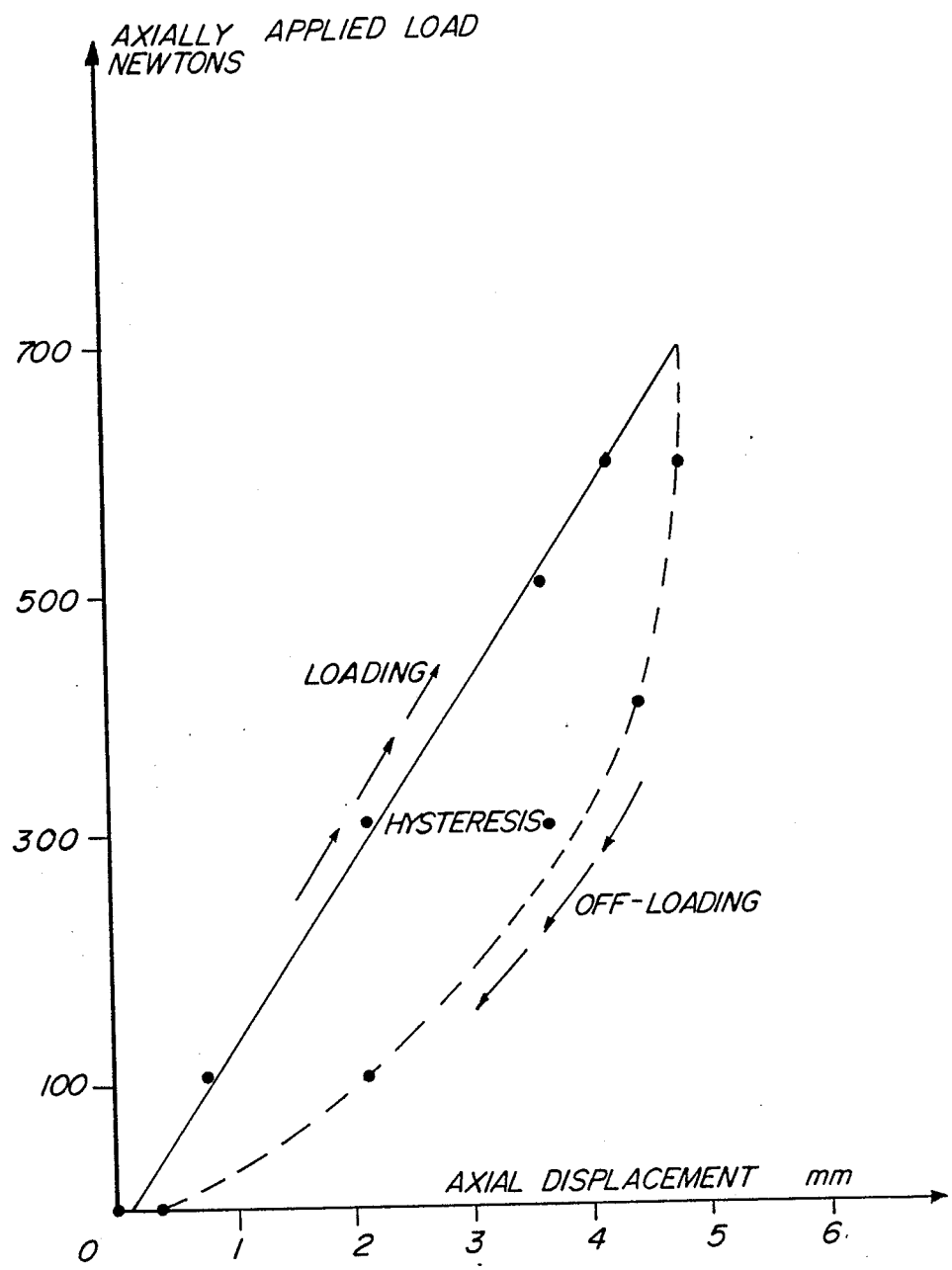
FIG. 6 is a graphical plot of relationships between axially applied loads and axial displacement of an experimental spring damper, incorporating the concepts of the invention according to test data.

The coefficient 0.117 is based upon the mean integral value of the shear strains for varying radial and angular coordinates. Computations of the axial stiffness utilising the various expressions above given was found to be in reasonable agreement with measured values. FIG. 6 which is a graphical plot of the axially applied load in pounds or Newtons and the axial displacement in inches or millimeters of a module under load, indicates that the measured slope of the load displacement variation was in satisfactory agreement with computed results.

Figure 7:
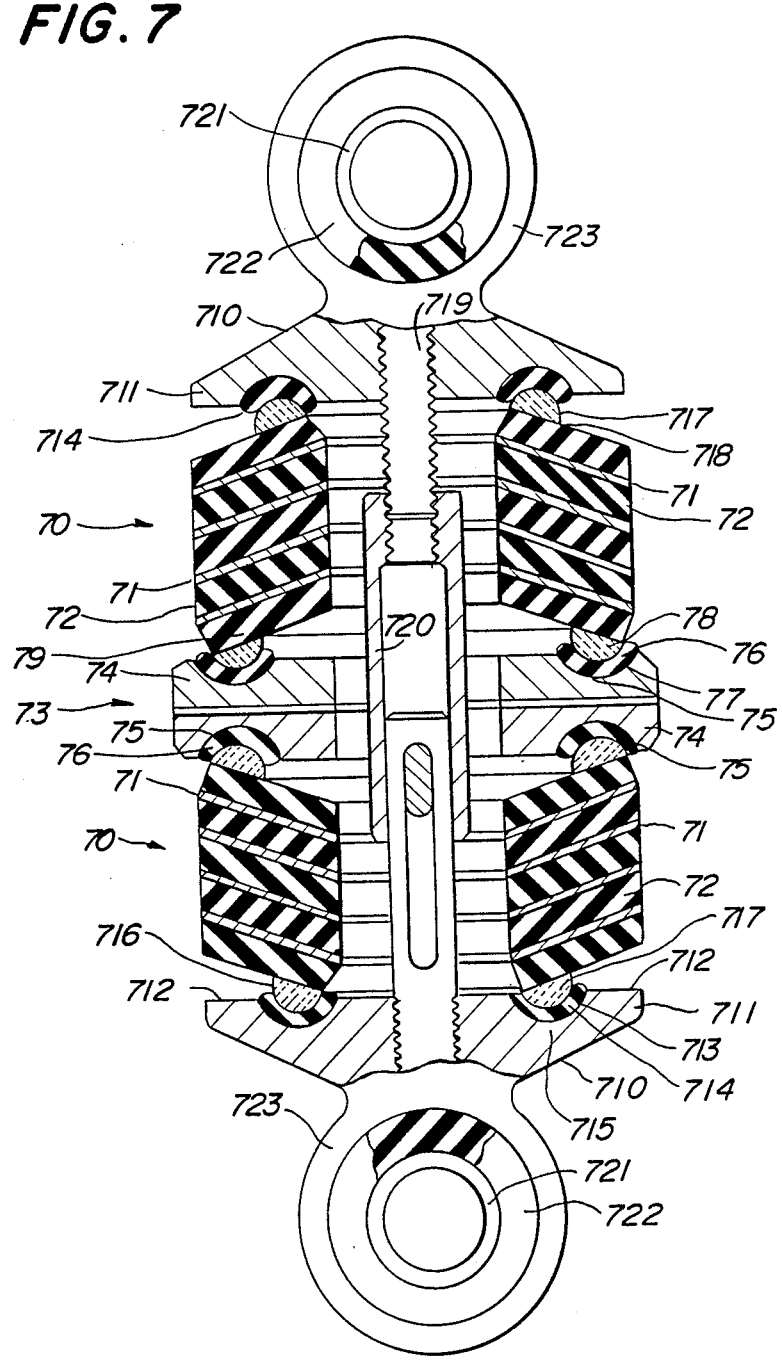
FIG. 7 illustrates an embodiment of a practical arrangement involving two modules in series.

Reference will now be made to FIG. 7 which illustrates a prototype practical arrangement or unit for effecting vibration damping between two structures (not shown) the unit including two modules 70 incorporating the concepts of the invention and arranged in series.

The two modules 70 are similar to each other and each comprise four discontinuous frusto-conical disc spring elements 71 in a parallel configuration of the kind hereinbefore discussed together with five elastomeric matrix layers 72. The two modules are mounted with the wider diameter ends thereof in face-to-face relationship by way of a coupling arrangement 73 including two similar central annular ring members 74 each having on one annular face thereof a circumscribing semi torroidal channel 75. The ring members 74 are arranged so that the channels 75 face away from each other. A preformed layer 76 of an elastomeric material is provided in each of the channels 75. Each layer 76 provides a channel shaped bearing surface for a correspondingly shaped bearing surface 77 provided on a ring 78. The ring 78 is provided with a frusto-conically shaped bearing surface 79 which is intended to cooperate with and bear against the outer peripheral regions of the outermost matrix layer 72 over a frusto-conical region thereof.

A load transmitting and coupling means 710 is provided at each end of the two module assembly. Each load transmitting and coupling means includes a flanged plate assembly 711 including an abutment surface 712 having a semi-torroidal channel shaped recess 713 in which is located a preform layer 714 of an elastomer defining a contact surface 715 for receiving a correspondingly shaped bearing surface 716 provided upon a load transmitting ring 717 having also a frusto-conical surface 718 adapted for engagement with the inner peripheral region of the outermost elastomeric matrix layer 72.

The flanged plate assemblies 711 are each provided with a threaded portion 719 which is intended to engage with a threaded sleeve 720 in such manner that relative rotation between the flanged plate assemblies 711 varies the initial precompression acting on the modules.

In addition, the flanged plate assemblies are provided with connecting elements including a shear pin sleeve 721 mounted within a lug member 722, therebeing an elastomeric matrix sleeve 723 interposed between the sleeve 721 and the lug member 722. The above discussed lug members 722 serve as the means whereby the integrated spring damper unit may be coupled to the structures between which relative damping and axially elastic connection is desired.

In operation, if the two flanged plates are moved towards each other thereby tending to flatten the frusto-conical spring elements the curved bearing surfaces 5 are allowed to rotate or roll within the associated semi-torroidal channels together with bonded to it preform surfaces thereby automatically accommodating the relative rotation during axial compression movements of the two modules. Similarly, on reduction or removal of the compressive forces the spring elements of the modules will return towards their initial configuration so that the rolling movemnt between the boundaries of modules and the associated semi-torroidal channels will be free to develop also in the reverse direction.

As a consequence of the inter-reaction between the spring elements and the various layers of elastomeric matrix the rate or speed at which axial compression and transverse restoring displacement take place will be reduced.

Figure 8:
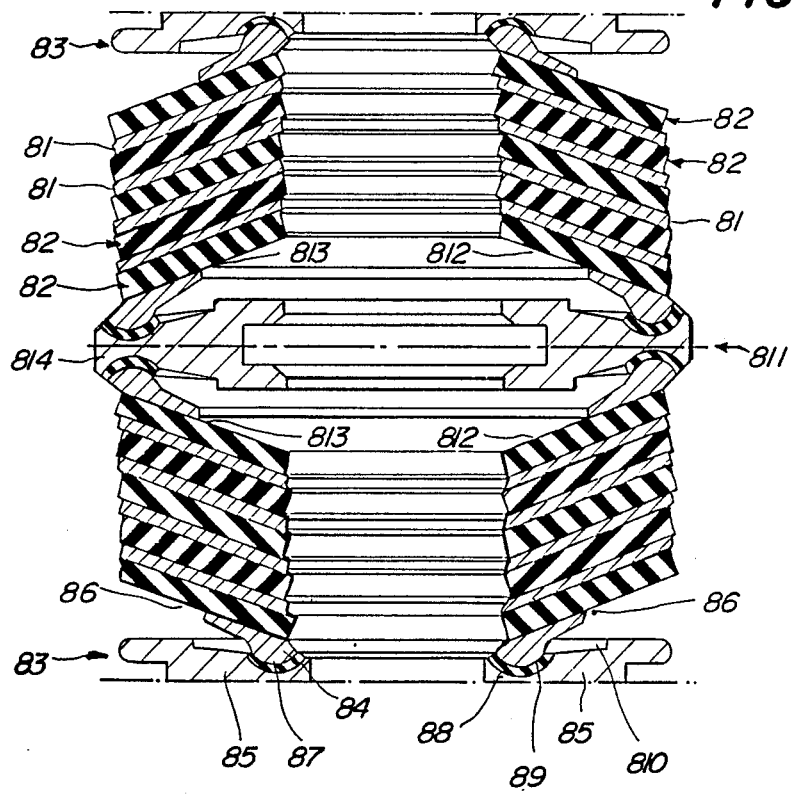
FIG. 8 illustrates a second embodiment of a practical arrangement involving two modules in series.

The structure of the spring damper arrangement shown in FIG. 7 can be evolved further Thus for example, in FIG. 8 a double module in series assembly is shown in which each module comprises four frusto-conical disc spring elements 81, and five associated matrix layers 82 The two load transmitting and coupling means 83 associated with the inner diameter end of each module have a structure differing from those involved with FIG. 7 in that the load transmitting ring 84 is provided with a flange 85 for an enhanced diffusion of axial loads into the matrix as an elastic foundation and which presents a frusto-conical surface 86 to the surface of the adjacent matrix layer 82. The ring 84 has the bearing surface 87 that cooperates with an elastomeric preform layer 89 located in an annular channel 88. In addition, the face 89 is provided with a recess 810 of somewhat greater depth than the shape of the flange 85, whereby on axial compression of the assembly of spring elements 81 and the layers 82 the means 84 are free to rotate about its elastic centre to accommodate the variation of slopes during compression. The flange is able to fold in the recess 810 during the final stages of a full compression of the modules, while the flat surfaces of attachments 83 will engage the outermost surfaces of matrices 82 in contact stress mode for substantial overload capability and increased axial stiffness. The compression can be such that the shells are flattened thereby enabling an extremely long operational stroke in comparison with the uncompressed state.

The coupling arrangement 811 of the FIG. 8 embodiment is likewise of a different construction from that of FIG. 7. The main difference is that the frusto-conical surface 812 that cooperates with the adjacent matrix layer is increased in bearing area by the provision of an integral flange 813. In addition, the coupling arrangement comprises a single ring member 814 which is more suitable for multi-module production units rather than the pair of members involved in the experimental prototype shown in he FIG. 7.

Figure 9:
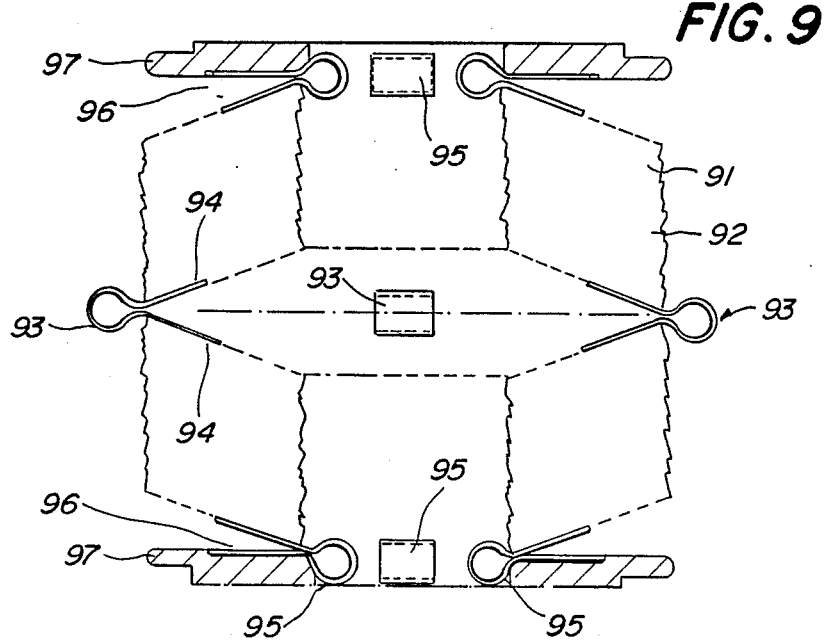
FIG. 9 illustrates a further embodiment of a practical arrangement involving two modules in series.

FIG. 9 illustrates a further embodiment of a double module disc spring damper arrangement. As before, the modules comprise a serial arrangement of discontinuous frusto-conical disc spring elements 91 and associated matrix layers 92. In the FIG. 9 embodiment the central coupling arrangement is in the form of a plurality of equiangularly spaced flexural spring members 93. The flexural spring members are shaped so as to present to the adjacent matrix layers load bearing portions 94 extending parallel to the adjacent frusto-conical matrix layer 92 When the spring elements and matrix layers are subjected to an axial load the springs 93 will be flexed correspondingly.

A number of similar flexural spring members 95 are provided at the inner diameter ends of the modules these spring members 95 being arranged similarly to the arrangement of the spring members 93. The spring members 95 have load bearing portions 96 which cooperate with the adjacent matrix layer and the load transmitting and coupling means 97. The number of spring members provided will be related to the axial loads to which the vibration damper is likely to be subjected. The flexural spring members 93 and 95 may incorporate tangential-hoop stiffeners.

Figure 9A:
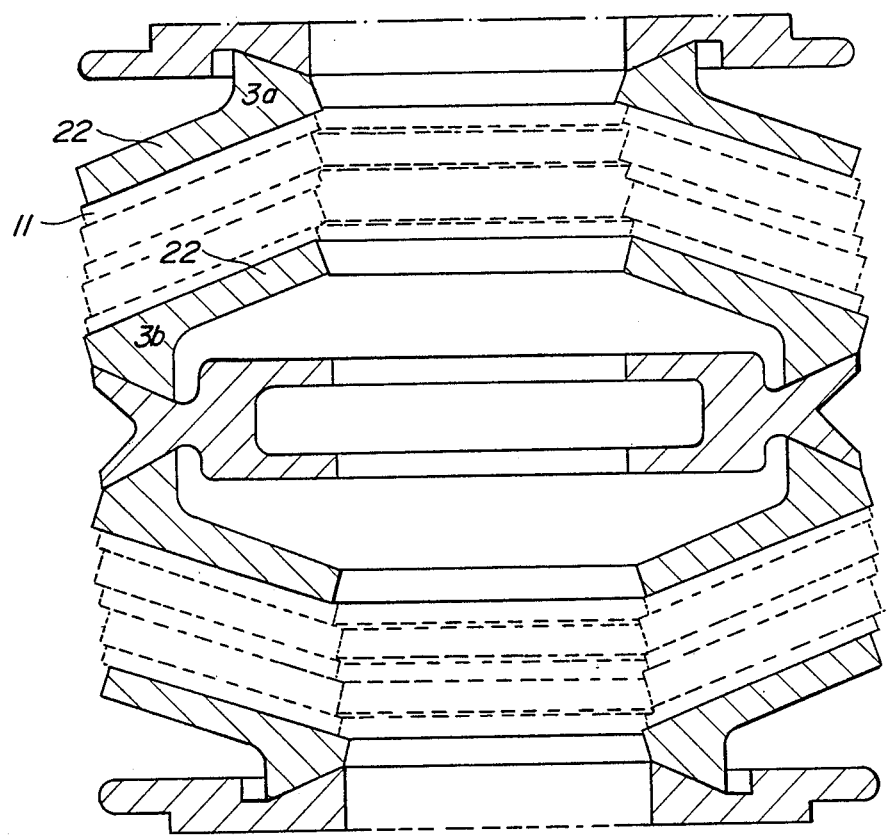
FIG. 9A illustrates still another embodiment of a practical arrangement involving two modules in series.

A simple construction of an intermodule and the main attachments (not shown) will incorporate only local reinforcements at the inner and outer peripheral edges 3a and 3b respectively of the attachment matrices according to FIG. 9A, with linearly increasing heights and suitable recesses for a transverse displacement (bulging) during compression.

Figure 10A:
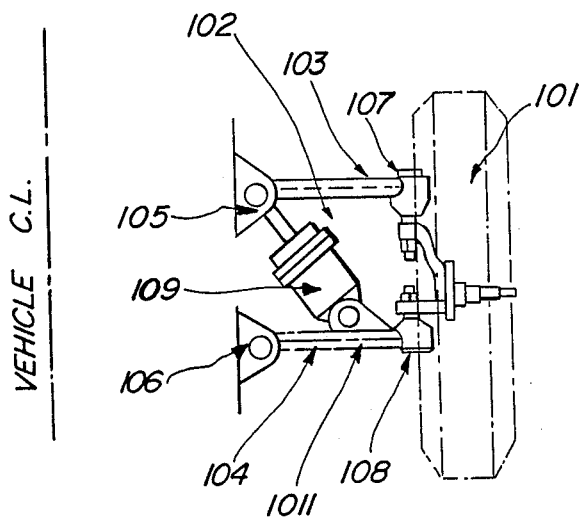
FIG. 10A is an elevation of the application of an integrated spring damper of the invention to the steerable wheels suspension of a motor vehicle.
Figure 10B:
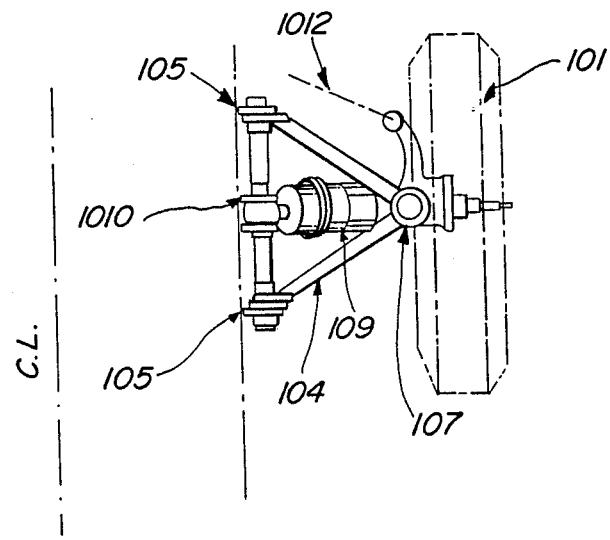
FIG. 10B is a plan elevation of FIG. 10A.

Referring now to FIGS. 10A and 10B these illlustrate the application of the integrated spring damper according to the concepts of the invention to the steerable wheels suspension of a motor vehicle. In the Figures the road running wheel is shown at 101. The wheel is coupled to the vehicle (not shown) by way of a suspension link 102 which is of the well known twin 'A' form. The suspension incorporates an upper 'A' link 103 and a lower 'A' link 104. The upper and lower 'A' links 103 and 104 are respectively pivotally connected to the vehicle by way of pivot connections 105 and 106 and to the wheel structure by way of universal spherical joints 107 and 108.

A spring damper unit 109 in accordance with the invention is connected into the suspension in such manner that the unit forms the diagonal member of the suspension parallelogram. The upper end of the unit 109 is pivotally connected to lugs 1010 on the vehicle whilst the lower end of the unit 109 is pivotally connnected to lugs 1011 located at the lower 'A' link.

The elements 1012 form part of the wheel steering arrangements.

It will be noted that with the above arrangement of FIGS. 10A and 10B the spring damper unit 109 is positioned as to reduce, dynamic loads and amplitudes of oscillations induced into the linkage by reason of vertical movements of the wheel 101 within the plane of its rotation.

I claim:

1. For use in damping motion on an axis, a damper comprising:
   a first annular layer of material having a predetermined elasticity;
   a second annular layer of material having a predetermined elasticity greater than said first layer;
   said first layer having a predetermined thickness in a frusto-conical plane surrounding said motion axis and a radial discontinuity affording flexure with respect to said plane when said layers are displaced axially of said axis;
   said first layer also having an inner portion adjacent to said axis lying in a first plane orthogonal to said axis and an outer portion lying in a second axially-spaced plane parallel to said first plane, said inner portion of said first layer being displaceable axially out of said first plane and toward said second plane in a first axial direction and being displaceable in a second axial direction opposite said first axial direction; and means for applying alternating pressure to said layers in said opposite directions along said axis for displacing said layers and causing said first layer to cooperate with said pressure applying means to cause said second layer to undergo elastic shearing in a generally radial and tangential direction;

whereby motion applied on the axis is damped.

2. A damper for use in connecting separate bodies together for relative motion on an axis of motion, comprising:

a plurality of spaced parallel annular disc spring elements having inner and outer peripheral edges, each of said disc elements having opposite sides inclined at an angle with respect to said motion axis, at least one of said elements having a discontinuity extending between said edges and having a cross sectional configuration permitting axial elastic displacement permitting axial elastic displacement due to flexure of said element;

a visco-elastic matrix engaged between said elements;

means for connecting said elements between said bodies to cause said axial displacement of said disc elements in response to axial movement of said bodies;

said disc elements causing said visco-elastic matrix to undergo shearing in at least a generally radial direction of said motion axis in response to motion of said elements on said axis for effecting a desired motion damping action.

3. Apparatus as claimed in claim 2, wherein said disc spring elements are bodies of revolution, and the respective axes of revolution align with the axis of motion of the bodies causing displacement of said elements.

4. Apparatus as claimed in claim 3, wherein said elements are frusto-conical and said discontinuities are radially directed.

5. Apparatus as claimed in claim 4, wherein at least two of said elements include discontinuities positionally offset with respect to each other.

6. Apparatus for damping motion of a structure on an axis relative to a support, comprising:

flange means disposed in spaced relation on said axis for connecting respectively to the structure and the support;

a plurality of motion damping modules disposed on said axis between said flange means;

coupling means disposed on said axis intermediate said flange means and said plurality of motion damping modules;

said motion damping modules including alternating layers of elastomeric material and annular disc elements surrounding said axis at an angle relative thereto, said disc elements having a radial gap forming a discontinuity therein to permit peripheral expansion and contraction of the disc elements in response to motion of said flange means in opposite directions, said disc elements cooperating with said elastomeric material to cause it to undergo elastic shearing in generally radial and tangential directions in response to said motion; and means for connecting said flanges together on said axis to preload said motion damping modules and to limit axial separation of said flanges;

whereby motion imparted on said axis is damped.

7. Apparatus according to claim 6 wherein:

said disc elements have inner and outer peripheral edges disposed in separate planes orthogonal to said axis;

the inner edges being normally located closer to said axis than the outer edges;

said disc elements each having a cross-sectional configuration between the inner and outer edges permitting elastic flexure about a neutral second axis disposed at said angle relative to said motion axis.

8. Apparatus according to claim 7 wherein:

said disc elements have a frusto-conical configuration and are disposed in parallel relation;

said radial gaps in adjacent selected disc elements are circumferentially displaced from one another; and said modules are arranged on said motion axis with the frustrums of said disc elements facing away from said coupling means.

9. A system as claimed in claim 6 wherein said flange and coupling means include semitoroidal means for enabling rolling action between said modules during flexural operational displacement of said modules.

10. A system as claimed in claim 6 wherein adjacent ones of said modules include means for selectively presetting a predetermined initial axially directed compressive force.

11. For use in damping motion along an axis, a damper, comprising:

at least one planar annular element surrounding said axis peripheral edge, an outer peripheral edge, and a gap extending between said edges rendering said element discontinuous, said edges normally being located in axially-spaced planes orthogonal to said axis, said element having a cross-section between said edges that permits elastic flexure when said inner edge is deflected along said axis, said element also having opposite surfaces that extend radially between said inner and outer edges at an angle to said axis of motion, said surfaces being movable inwardly and outwardly of said motion axis during deflection of said element and flexure thereof;

a first layer of elastomeric means engaging at least one of said element surfaces;

means for applying pressure to the other of said element surfaces in the direction of said motion axis;

said pressure applying means cooperating with said element to cause said elastomeric means to undergo shearing in generally radial and tangential directions in response to axial deflection of said inner edge of said element along said motion axis and inward and outward motion of said surfaces;

whereby motion imparted along the motion axis is damped.

12. A damper according to claim 11 wherein said pressure applying means includes a second layer of elastomeric means engaging said other element surface and a second planar element, like in construction to said one planar element, engaging said second elastomeric layer, said planar elements being arranged with their radial gaps offset angularly relative to one another to form a stack.

13. A damper according to claim 12 wherein said planar elements are of thin-walled frusto-conical shape and are bonded to said elastomeric layers.

14. A damper according to claim 13 including means extending along said motion axis for preloading said elastomeric layers and for connecting said stack to spaced bodies movable on said motion axis.

* * * * *